(12) United States Patent
Miyagawa et al.

(10) Patent No.: US 6,510,116 B1
(45) Date of Patent: Jan. 21, 2003

(54) OPTICAL INFORMATION RECORDING/REPRODUCING METHOD AND OPTICAL INFORMATION RECORDING/REPRODUCING APPARATUS

(75) Inventors: Naoyasu Miyagawa, Hyogo (JP); Takashi Ishida, Kyoto (JP); Junichi Minamino, Nara (JP); Kenji Koishi, Hyogo (JP); Shigeru Furumiya, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/493,102

(22) Filed: Jan. 28, 2000

(30) Foreign Application Priority Data

Jan. 29, 1999 (JP) ............................................. 11-21886

(51) Int. Cl.⁷ ................................................. G11B 5/09
(52) U.S. Cl. .................................. 369/59.12; 369/47.53
(58) Field of Search ................................ 369/54, 47.53, 369/116, 47.51, 59.14, 60.01, 47.28, 47.3, 59.11, 59.12, 117.17, 53.34, 59.2, 47.26, 59.16

(56) References Cited

U.S. PATENT DOCUMENTS

| | | | | | |
|---|---|---|---|---|---|
| 5,070,495 A | * | 12/1991 | Bletscher et al. | ............ | 369/111 |
| 5,345,434 A | * | 9/1994 | Ide et al. | .................. | 369/59.12 |
| 5,406,368 A | * | 4/1995 | Horiuchi et al. | ............ | 356/73.1 |
| 5,450,383 A | * | 9/1995 | Call et al. | ..................... | 369/100 |
| 5,808,988 A | * | 9/1998 | Maeda et al. | ............ | 369/275.3 |
| 5,881,039 A | * | 3/1999 | Sano et al. | ............... | 369/59.15 |
| 6,078,559 A | * | 6/2000 | Takemura et al. | ....... | 369/275.1 |
| 6,118,753 A | * | 9/2000 | Keshner et al. | .......... | 369/275.3 |
| 6,243,339 B1 | * | 6/2001 | Spruit et al. | ............. | 369/47.17 |
| 6,345,026 B1 | * | 2/2002 | Furukawa et al. | .......... | 369/116 |

FOREIGN PATENT DOCUMENTS

JP        63-48617        3/1988

* cited by examiner

Primary Examiner—David Davis
Assistant Examiner—Jennifer M Dolan
(74) Attorney, Agent, or Firm—Wenderoth, Lind & Ponack, L.L.P.

(57) ABSTRACT

When data is reproduced by an apparatus which is different from an apparatus used for recording the data, the fluctuation of edge positions of the reproducing data increases, making reproduction incompatible, and the present invention solves this problem. The present invention comprises reproducing learning means 13 and 24 for switching a frequency characteristic of the reproducing system, which detects the changes of the local optical constant, to a predetermined frequency characteristic, and recording learning means 20 for correcting the start edge or end edge position of the recording pulse for each combination of length of a mark block and length of the preceding or subsequent space, so that the edge position of the binarized reproducing data comes to a desired position, and since the frequency characteristic of the reproducing system is unified before learning the edge shift amount caused by the thermal interference between marks, the length of the recorded marks and spaces can always be constant, which improves the reproducing compatibility among reproducing apparatuses.

14 Claims, 10 Drawing Sheets

Fig.9A RECORDING DATA
Fig.9B RECORDING PULSE
Fig.9C RECORDING MARK
Fig.9D REPRODUCING SIGNAL
Fig.9E BINARY SIGNAL
→ LIGHT BEAM TRAVELING DIRECTION
Fig.10
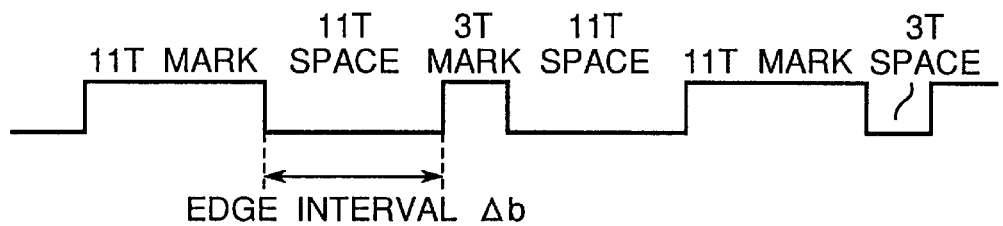
($\Delta a \neq \Delta b$ IN REPRODUCING SIGNAL)

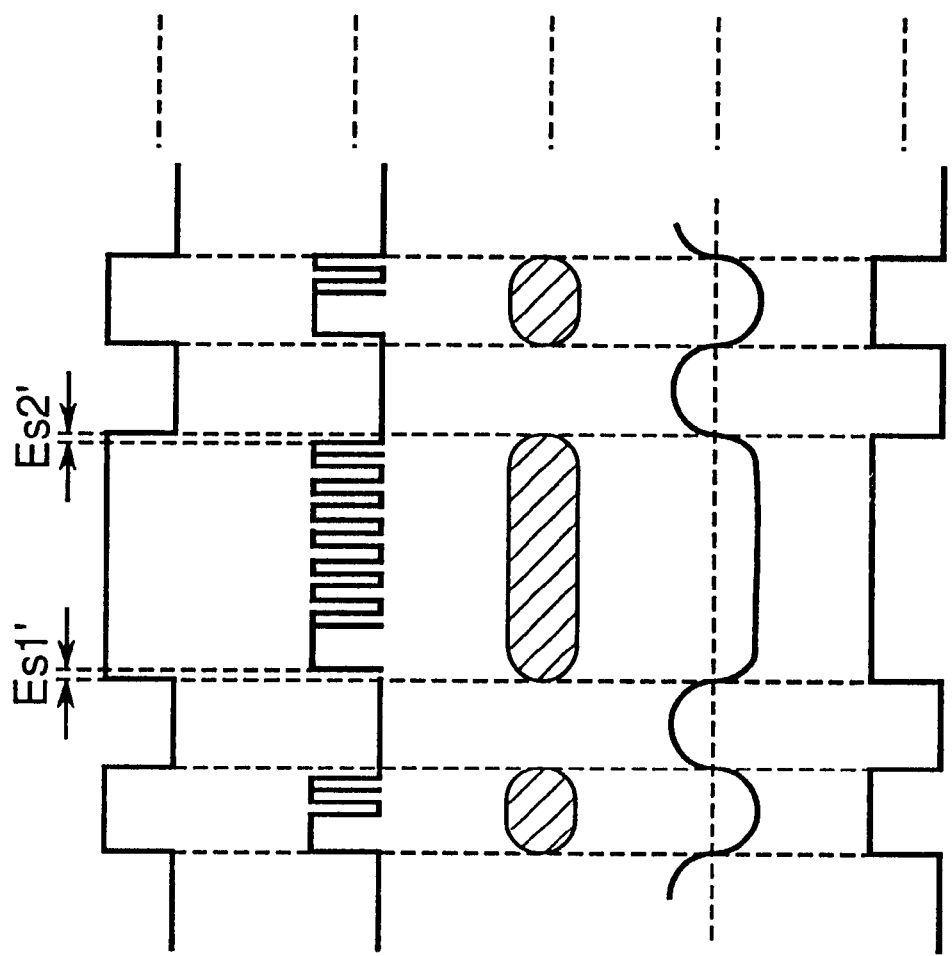

OPTICAL INFORMATION RECORDING/REPRODUCING METHOD AND OPTICAL INFORMATION RECORDING/REPRODUCING APPARATUS

BACKGROUND OF THE INVENTION

1. Field of the Invention

The present invention relates to an optical information recording/reproducing method and an optical information recording/reproducing apparatus for recording data on an erasable type optical disk by a mark edge recording method, and more particularly to recording compensation for accurately controlling an edge position of a recording mark.

2. Description of the Related Art

The development of an optical information recording medium which can record and reproduce such information signals as video and audio signals, particularly optical disks, is active. One optical disk media which can record information at high density is a phase change type optical disk. Data is recorded on a phase change type optical disk by emitting a laser beam narrowed down to a 1 μm or less diameter on a rotating disk, so as to heat and fuse the recording film. Depending on the strength of the recording light beam, the temperature on the recording film when the beam reaches the disk and the cooling process differ, and a phase change of the recording film occurs between the crystal state and amorphous state.

When the light beam is strong (called "peak power level"), the recording film becomes amorphous since the recording film is heated beyond the fusing point, fuses, then rapidly cools down. When the light beam is at medium strength (called "bias power level"), the recording film is crystallized since the recording film is maintained at a temperature higher than the crystallization temperature but is lower than the fusing point. The amorphous part is called a "mark", and the crystallized part is called a "space". The method of recording data by assigning information to the length of the mark and space is called the "mark edge recording method". Since a phase change optical disk can create marks by fusing the recording film at a peak power level, whether the recording film is in an amorphous state or crystal state, simultaneously erasing old data and recording new data using one light beam, that is, direct overwriting, is possible.

However, when a long mark is recorded by mark edge recording, if a light beam at peak power level is emitted to the mark part at a predetermined intensity, the width of the mark becomes gradually wider toward the end of the mark, since heat accumulates on the recording film. This causes signal quality deterioration, such as incomplete erasure, during direct overwriting. To prevent this, recording marks by a light beam which switches alternately between peak power level and bias power level at high-speed between mark blocks, that is, multi-pulse recording, is effective. By this method, the heat accumulating effect at the latter half of a mark subsides, and a mark with a predetermined width from start to end can be created.

For reproducing, a light beam which is weak enough not to cause a phase change of the recording film is emitted, and the intensity of the reflected light is detected by a photo-detector. Since the reflectance of the mark part, which is amorphous, can be significantly different from the reflectance of the space part, which is crystallized, by choosing the material of the recording film and the configuration of the recording film and the protective layer, reproducing signals of the recorded data can be obtained by detecting the difference of the reflected light intensity between the mark part and the space part.

A possible way to improve the recording density of the phase change type optical disk is to decrease the length of the mark and the space to be recorded. If a space length is short, however, the heat at the end edge of the recorded mark conducts through the space part and affects the temperature rising at the start edge of the next mark, or the heat at the start edge of the mark recorded next affects the cooling process at the end edge of the previous mark, that is, thermal interference occurs. As a result, the edge position of the mark changes, and the data error rate at reproduction increases. This phenomena will be described with reference to FIGS. 9(a) to (e). FIG. 9(a) is a waveform diagram where the recording data is shown in binary, (b) is a waveform diagram indicating the intensity of laser beam emission in binary, where one mark corresponds to a plurality of short pulses, as mentioned above. (c) is an illustration of recording marks created on the disk, (d) is a waveform diagram of the reproducing signals of the recording mark in (c), and (e) is a waveform diagram when the reproducing signals are binarized. In FIGS. 9(a) to (e), a case where a short space is before and after a long mark is shown as a characteristic example of the influence of thermal interference. If the start and end edges of the emission pulses in (b) are placed at the same positional relationship as the start and end edges of the recording data in (a), the start and end edges of the recording mark extend as shown in (c), regardless of the length of spaces before and after. In FIGS. 9(a) to (e), the amount of shift at the front edge and rear edge of the mark at the center are denoted by Es1 and Es2. As a result, the mark block becomes longer than the desired length, as shown in FIG. 9(d), and an edge shift occurs when the waveform is binarized, as shown in FIG. 9(e).

The amount of fluctuation of the edge position due to the thermal interference differs depending on the length of the space before and after the target mark. Therefore, to solve this problem, Japanese Patent Application Laid-Open No. S63-48617 discloses a technology to compensate for the fluctuation of the edge position due to thermal interference by changing the start edge position of the recording pulse of the mark part in advance according to the length of the space before the mark. The amount of change of the start edge position is determined by recording a test pattern comprised of a plurality of combinations of marks and spaces of different lengths in advance, reproducing the test pattern, and measuring the deviation between the edge positions of the reproducing signals and the target values. FIG. 10 shows an example of a test pattern. The pattern of the test pattern is different depending on the data modulation system, but includes at least the shortest mark and space and the longest mark and space which become the references for measuring edge positions. If it is assumed that the channel bit length to be the unit of length of marks and spaces is T, then the shortest channel bit length of recording data is 3T, and the longest is 11T in the case of 8–16 modulation. For example, the edge interval from the reference mark (11T) in the reproducing signal is different between a case where the length of the subsequent space of the 3T target mark is 3T and a case where the length is 11T. A method of compensating for the edge shift with a deviation amount determined by recording such test pattern will be described with reference to FIGS. 11(a) to (e). FIGS. 11(a) to (e) show the recording data, laser emission signal, recording marks, reproducing signal and binary signal respectively, just like FIG. 10. Edge compensation is executed by shifting the front edge pulse and rear edge pulse of the laser emission signal by Es1' and Es2' corresponding to the above mentioned shift amounts Es1 and Es2, as shown in FIG. 11(b). In this way, a desired length of marks can be recorded as shown in FIGS. 11(c) to (e), which can prevent data reproducing errors.

With such a conventional optical information recording/ reproducing method and optical information recording/ reproducing apparatus, however, the fluctuation of the edge position of reproducing data can be decreased when reproducing data with the same apparatus as the apparatus which recorded the data, but if the data is reproduced with an apparatus which is different from the apparatus which recorded the data, the fluctuation of the edge position increases, influenced by the laser spot shapes of recording and reproducing, the characteristic irregularity of the recording film, and the characteristic irregularity of the reproducing system, that is, reproducing compatibility cannot be implemented. This problem will be described below.

The correction amount of the edge position generated by thermal interference is determined by the recording/ reproducing of the test pattern, but the correct amount is influenced by the group-delay characteristics of the reproducing optical system and reproducing circuit. This is because the test pattern includes short marks and spaces and long marks and spaces, as mentioned above. In order to learn the correction amount of an edge, the interval between the front or rear edge of the long mark to be a reference and the edge of the short mark, which is the measurement target, must be measured. If the reproducing system has a group-delay characteristic, the reproducing signals of a short mark and space delay or advance from the reproducing signals of a long mark and space, so the shift amount of the edge of the marks cannot be correctly measured. Therefore, even if an apparatus having the group-delay characteristic learns the correction amount of the edge and records such that the shift amount in the binary signals is 0, an edge shift occurs to the reproducing signals if the data is reproduced by an apparatus for which the group-delay characteristic is different, or which does not exist at all. In other words, the lengths of the same mark and space differ after binarization depending on the reproducing apparatus.

With the foregoing in view, it is an object of the present invention to provide an optical information recording/ reproducing method which accurately compensates for the edge shift amount caused by the thermal interference between recording marks and easily implements compatibility among reproducing apparatuses.

SUMMARY OF THE INVENTION

To achieve the above object, an optical information recording/reproducing method in accordance with the present invention is an optical information recording/ reproducing method where length information on a mark block and a space block is used as data, the data is recorded in the form of changes of a local optical constant on a recording layer by emitting a light beam to an optical medium while switching the intensity of the light beam according to one or more recording pulses for the mark block, and the data is reproducing by detecting the changes of the above mentioned local optical constant by a light beam with a predetermined intensity. The optical information recording/reproducing method comprises a reproducing learning step for switching the frequency characteristic of a reproducing system for detecting the change of the above mentioned local optical constant to a predetermined frequency characteristic, and a recording learning step for reproducing a test pattern recorded on the above mentioned optical information recording medium and correcting the start edge or the end edge position of the above mentioned recording pulse for each combination of length of the above mark block and length of the preceding or subsequent space block, so that the edge position of the binarized reproducing data comes to the desired position.

BRIEF DESCRIPTION OF THE DRAWINGS

FIGS. 9(a) to (e) are illustrations depicting an edge shift caused by the thermal interference between recording marks;

FIG. 10 is a waveform diagram depicting an example of test patterns; and

FIGS. 11(a) to (e) are illustrations depicting an edge shift correction.

DESCRIPTION OF THE PREFERRED EMBODIMENTS

The embodiments of the present invention will now be described.

In the following embodiments, an optical disk using phase change type recording material, where data is recorded by the changes of actual reflectance, is used for description as an example of the optical information recording medium.

Embodiment 1

Figure 1:
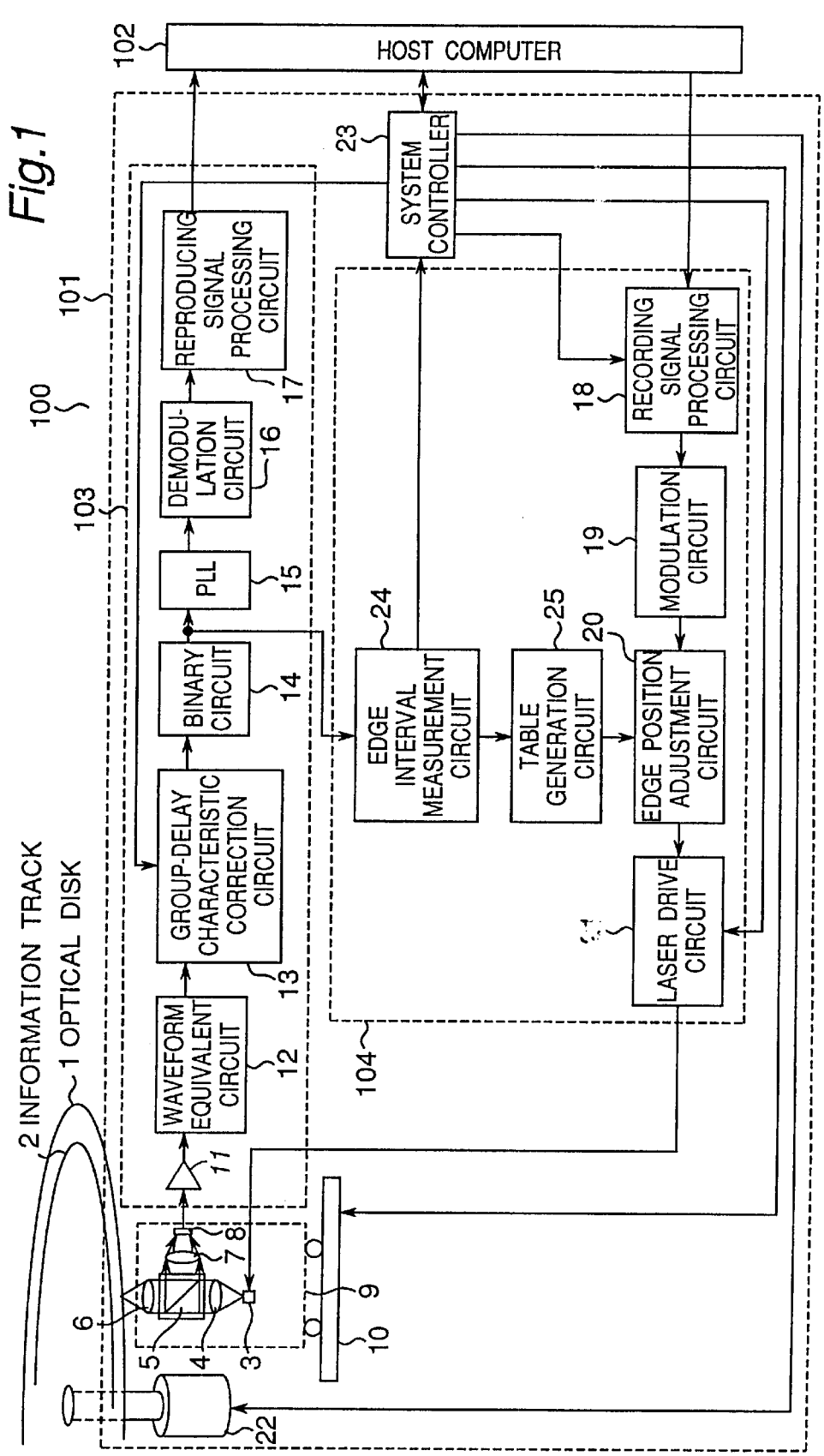
FIG. 1 is a block diagram depicting a configuration of an optical disk unit where an optical information recording/ reproducing method in accordance with a first embodiment of the present invention is applied.

FIG. 1 shows a configuration of an optical disk unit where the optical information recording/reproducing method in accordance with the first embodiment of the present invention is applied.

As FIG. 1 shows, the optical disk unit 100 has an optical disk drive 101 for driving an optical disk 1 and a host computer 102. Information track 2 is formed on the optical disk 1, where data is recorded/reproduced when emitting a laser beam from an optical head 9.

The optical disk drive 101 comprises the optical head 9, a head transfer table 10, a reproducing signal processing part 103, a recording signal processing part 104, a spindle motor 22 for rotating the optical disk 1, and a system controller 23, as shown in FIG. 1. The optical head 9 further comprises a semiconductor laser 3, a collimator lens 4 for converting the light beam emitted from the semiconductor laser 3 to parallel light, a half mirror 5 disposed on the parallel beam, and an objective lens 6 for converging the parallel light transmitted through the half mirror 5 to the information face of the optical disk 1, and emits the light beam to the information track 2 of the optical disk 1. The optical head 9 also has a photo-detector 8 which receives light reflected on the surface of the optical disk 1 and passes through the objective lens 6, the half mirror 5 and a detection lens 7. The semiconductor laser 3, collimator lens 4, half mirror 5, objective lens 6, detection lens 7 and the photo-detector 8 are mounted on a head base, which is not illustrated, and constitutes the optical head 9. The optical head 9 is mounted on the head transfer table 10 so that it can be moved in the radius direction of the optical disk 1.

The reproducing signal processing part 103 further comprises an amplifier 11 which amplifies a light detection signal output from the photo-detector 8, and outputs it as a reproducing signal, a waveform equivalent circuit 12 which converts the frequency characteristic of the reproducing signal received from the amplifier 11, and outputs the signal, and a group-delay characteristic correction circuit 13, which receives output from the waveform equivalent circuit 12, adds the predetermined group-delay characteristic, and outputs the signal, a binary circuit 14 which receives the signal from the group-delay characteristic correction circuit 13, and outputs the binary reproducing signal, a PPL (Phase Locked Loop) 15 which generates a reproducing clock synchronizing the binary reproducing signal, and outputs a digital reproducing signal synchronizing with the reproducing clock, a demodulation circuit 16 which receives the digital reproducing signal, demodulates the signal and outputs demodulation data, and a reproducing signal processing circuit 17, which corrects errors of the received demodulation data, and outputs the corrected demodulation data to the host computer 102 as decoded data.

The recording signal processing part 104 further comprises a recording signal processing circuit 18, a modulation circuit 19, an edge position adjustment circuit 20, a laser drive circuit 21, an edge interval measurement circuit 24 and a table generation circuit 25. The recording signal processing circuit 18 receives the recording data from the host computer 102, adds error correction codes and other data, and outputs the data as encoded data. The modulation circuit 19 executes modulation appropriate for the optical disk, such as 8–16 modulation, and executes multi-pulsing on the received encoded data, and outputs the data as multi-pulsed modulation data. The edge position adjustment circuit 20 adjusts the positions of the start edge pulse and end edge pulse of the received modulation data based on the set values from the table generation circuit 25, and outputs the data as laser drive pulses. The laser drive circuit 21 outputs drive current to the semiconductor laser 3 according to the received laser drive pulses. The edge interval measurement circuit 24 extracts a combination pattern of a predetermined mark length and space length out of the binary reproducing signal output from the binary circuit 14, measures the edge interval, and outputs the data to the table generation circuit 25 and the system controller 23 as edge position data. The table generation circuit 25 creates the table of the edge set values based on the received edge position data, and outputs each edge set value to the edge position adjustment circuit 20.

The system controller 23 transmits drive signals to the head transfer table 10, so as to move the optical head 9 in the disk radius direction, having the optical beam access a desired position. The system controller 23 also calculates the group-delay characteristic based on the edge position data received from the edge interval measurement circuit 24, and outputs control signals for correction to the group-delay characteristic correction circuit 13.

The host computer 102, which is disposed outside the optical disk drive 101, inputs/outputs information signals and control data, including digital audio/video data and computer data.

Figure 2:
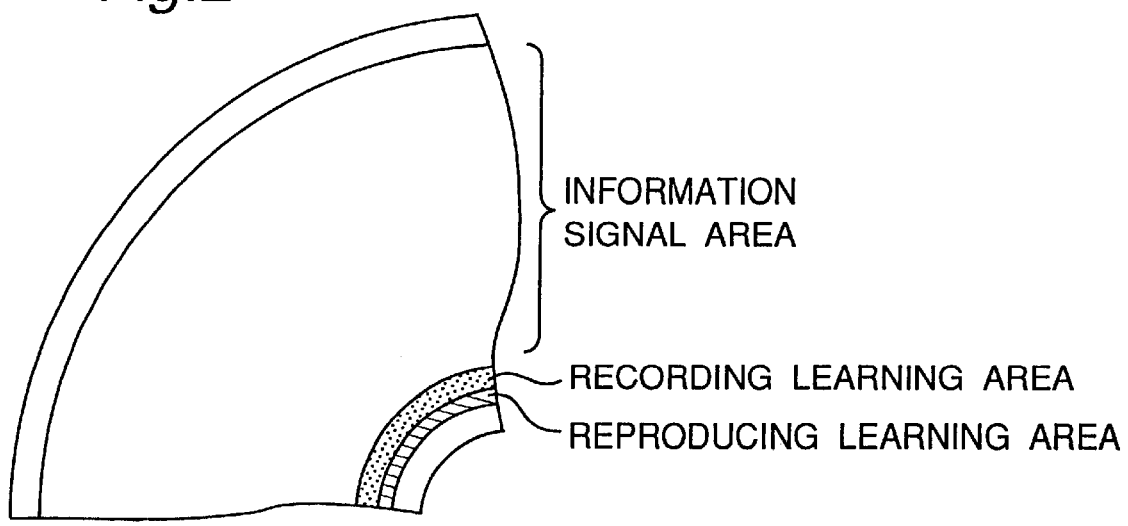
FIG. 2 is a drawing depicting a configuration of an optical disk used for the optical disk unit.

As shown in FIG. 2, the optical disk 1 has an information signal area where a track is formed by guiding grooves, and information signals are recorded as marks in an amorphous state and spaces in a crystal state, a reproducing learning area where guiding grooves are not formed and reference patterns for measuring the group-delay characteristic and other data have been formed in advance as embossed pits of the disk substrate, and the recording learning area where the track is formed by guiding grooves and test patterns for learning the edge shift amount are recorded as marks.

Now, the operation of the optical disk unit 100 comprised as above will be described with reference to FIG. 1.

Since the optical information recording/reproducing method in accordance with this embodiment is executed in the sequence of the reproducing learning step by reproducing the reproducing learning area, the recording learning step in the recording learning area, and the recording step of the information signals, these steps will now be described in this sequence.

At first, the host computer 102 transmits a command for indicating the reproducing mode to the system controller 23. The system controller 23 outputs a control signal corresponding to the command for indicating the reproducing mode to the spindle motor 22 and the laser drive circuit 21. After the spindle motor 22 starts rotating the optical disk 1, the laser drive circuit 21 enters the reproducing mode, and outputs drive current to the semiconductor laser 3, so that the semiconductor laser 3 emits at a predetermined reproducing power level.

The system controller 23 also outputs a control signal to the head transfer table 10, and moves the optical head 9 so that the light beam is positioned on the reference pattern of the reproducing learning area of the optical disk 1.

Next, the position control of the light beam in the focus direction and the disk radius direction (tracking direction) is executed. The position control of the light beam in the focus direction is implemented by general focus control, such as the astigmatism method, and the position control in the tracking direction is implemented by general tracking control, such as the push-pull method, for which description of is omitted here. By these position controls, the light beam can scan the reference pattern.

The light beam modulated with the reference pattern on the optical disk 1 is converted to the light detection signal by the photo-detector 8, and the signal is amplified by the amplifier 11, and then is transmitted to the waveform equivalent circuit 12 as a reproducing signal. In order to decrease interference between the codes of the reproducing signal, the waveform equivalent circuit 12 converts the reproducing signal such that the amplitude of the high frequency area is intensified, and outputs the signal to the group-delay characteristic correction circuit 13. The group-delay characteristic correction circuit 13 adds a predetermined delay amount to the reproducing signal by the control signal from the system controller 23, and outputs the signal to the binary circuit 14. For reproducing in the reproducing learning area, the group-delay correction circuit 13 does not correct the delay mount. The binary circuit 14 binarizes the analog reproducing signal at a predetermined slice level, and outputs the signal to the edge interval measurement circuit 24. The above reference pattern is a periodic pattern where the mark and space lengths increase sequentially from the combination of the shortest mark and shortest space, and since this pattern is known in advance, the group-delay characteristic up to the output of the binary circuit 14 is known by measuring the respective edge positions by the edge interval measurement circuit 24. In other words, there is a deviation between the measured edge interval and the original edge interval of the reference pattern, and if the deviation amount depends on the frequency, then it is known that the group-delay characteristic of the reproducing system is not flat.

The system controller 23 calculates the group-delay characteristic based on the edge position data which the edge interval measurement circuit 24 measured for each mark and space length, and outputs the control signal for correction to the group-delay characteristic correction circuit 13 so that the group-delay characteristic becomes flat. In this way, the group-delay characteristic of the reproducing signal processing part 103 becomes flat and the reproducing learning step ends. Instead of calculating the group-delay characteristic, it is also possible that the system controller 23 outputs some sets of the correction control signals to the group-delay correction circuit, and the edge interval measurement circuit 24 monitors the deviation amount between the measured edge position and the original edge position of the reference pattern each time, and the reproducing learning step ends when the deviation amount reaches the minimum.

Next, the recording learning step will be described.

The system controller 23 outputs a control signal to the head transfer table 10 and moves the optical head 9 so that the light beam is positioned onto the track of the recording learning area of the optical disk 1. Then the system controller 23 transmits a control signal to the recording signal processing circuit 18 so as to output the test pattern data for recording learning, and the test pattern data is transmitted to the semiconductor laser 3 via the modulation circuit 19, the edge position adjustment circuit 20 and the laser drive circuit 21. The semiconductor laser 3 emits the light beam, which is modulated between the peak power level and the bias power level, and a mark corresponding to the test pattern is recorded on the disk. At this time, the set values of the start edge and the end edge pulses in the edge position adjustment circuit 20 have been set to predetermined initial values. When the recording of the test pattern ends, the system controller 23 enters the reproducing mode and transmits the control signal to the laser drive circuit 21 and the head transfer table 10 so as to reproduce the test pattern recorded on the disk.

When the position of the light beam is controlled to be on the test pattern recorded in the recording learning area, the steps up to binarizing the reproducing signal are executed in the same way as the reproducing learning step. Here, the group-delay characteristic correction circuit 13 has been set in the previous reproducing learning step so that the group-delay characteristic of the reproducing system becomes flat. The edge interval of the binary signal is measured by the edge interval measurement circuit 24. The table generation circuit 25 creates a table of the edge set values based on the measured edge position data such that the edge shift becomes small, and transmits the table to the edge position adjustment circuit 20.

Figure 3:
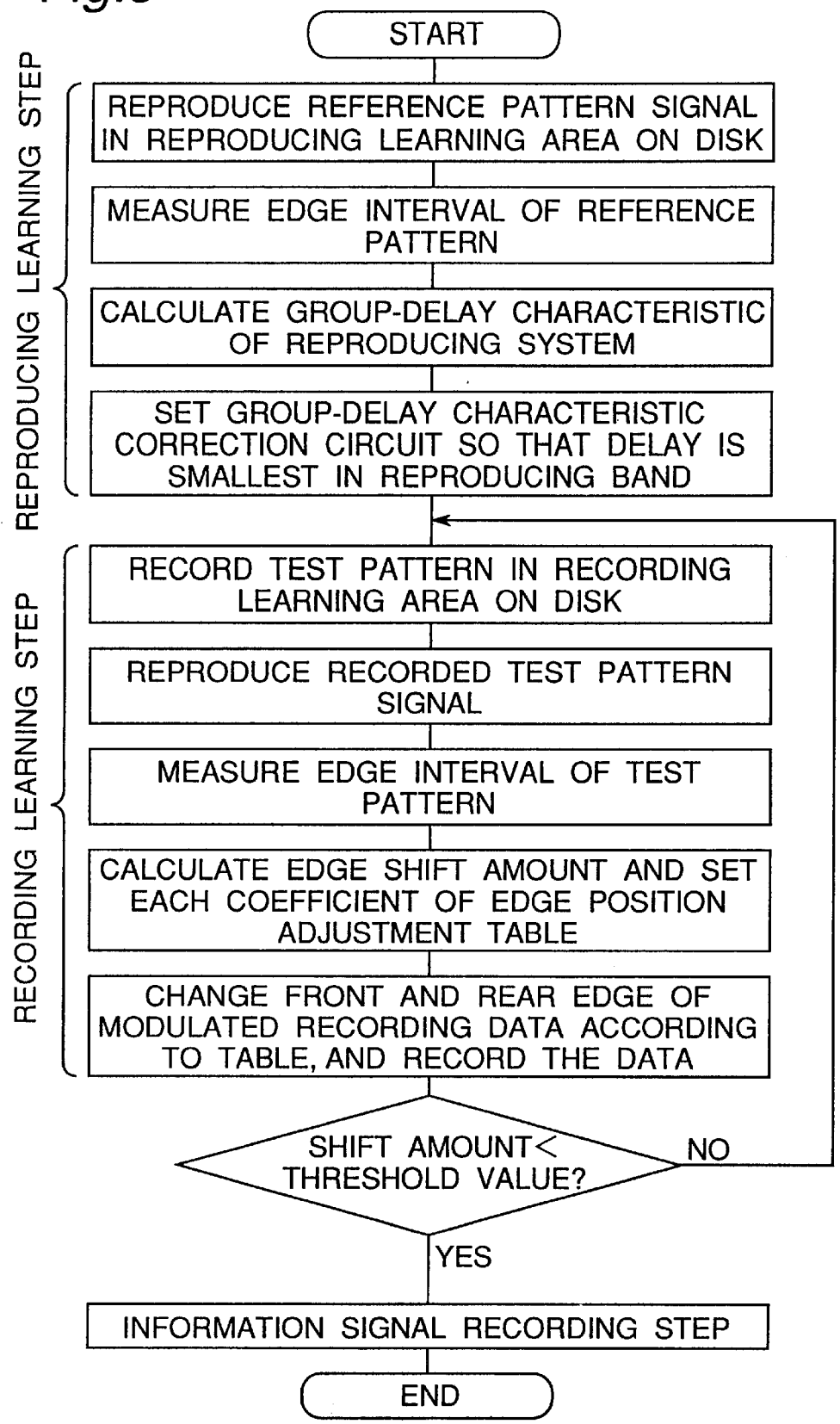
FIG. 3 is a flow chart depicting the learning method in accordance with the first embodiment.

When the above recording and reproducing of the test pattern are repeated, and the edge shift becomes 0 or the desired threshold value or less, the system controller 23 ends the recording learning step. Since the table of the edge set values at this time has been created in the state where the frequency characteristic of the group-delay of the reproducing system is flat, accurate recording is possible if the data is recorded with these set values, regardless of the combination of marks and spaces. FIG. 3 shows a flow chart from the start of the reproducing learning step to the end of the recording learning step.

Steps #1 to #4 indicate the reproducing learning step, and steps #5 to #10 indicate the recording learning step. Each step will be described in this sequence.

Step #1: A reference pattern signal which has been recorded in the reproducing learning area of the disk in advance is reproduced.

Step #2: An edge interval of the reproduced reference pattern signal is measured.

Step #3: A group-delay characteristic of the reproducing system is calculated.

Step #4: The group-delay characteristic correction circuit 13 is set such that the delay in the reproducing band becomes smallest.

Step #5: A test pattern is recorded in the recording learning area of the disk.

Step #6: The recorded test pattern signal is reproduced.

Step #7: The edge interval of the test pattern is measured.

Step #8: The edge shift amount is calculated and each coefficient of the edge position adjustment table is set.

Step #9: Front and rear edges of the modulated recording data are changed according to the table and are recorded.

Step #10: It is judged whether the shift amount is a predetermined threshold value or less. If the shift amount is not the threshold value or less, processing returns to step #5.

Step #11: General information signals are recorded.

Figure 4A:
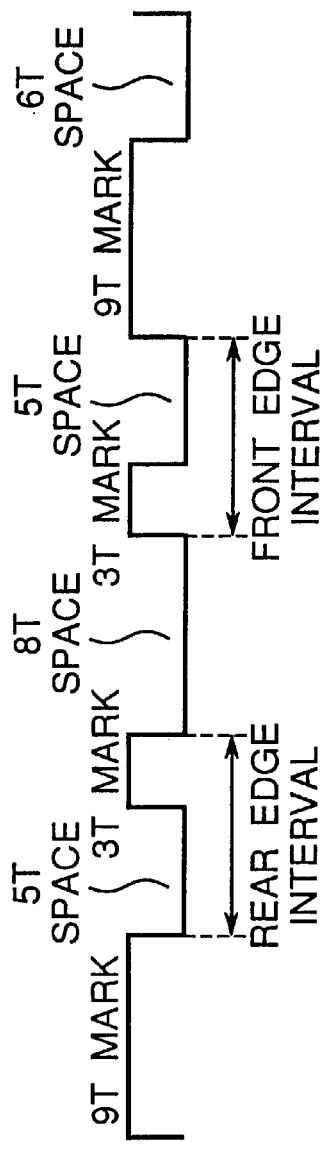
FIGS. 4(a) to (c) are waveform diagrams depicting an example of a reference pattern of a reproducing learning area in accordance with the first embodiment.
Figure 4B:
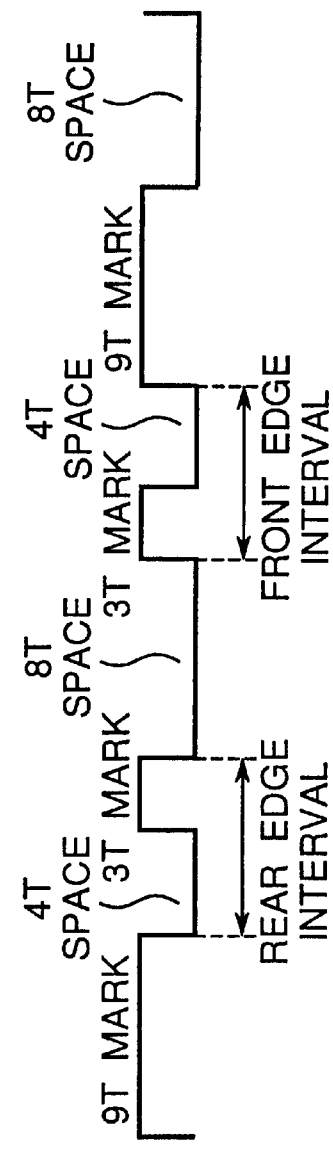
Figure 4C:
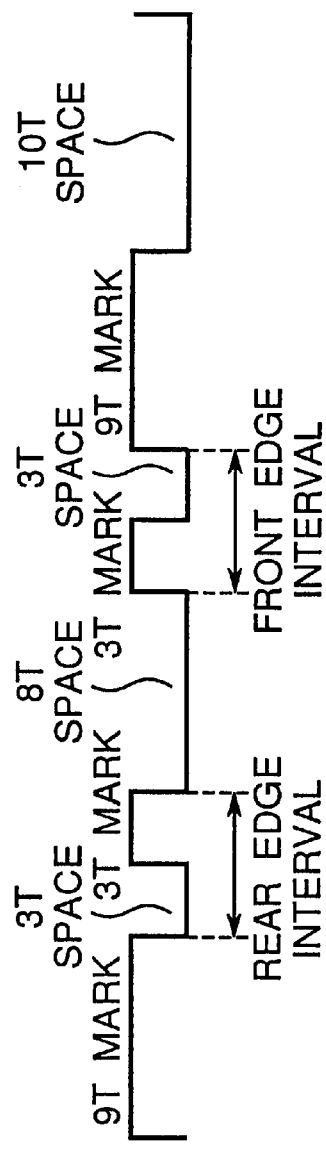

In the table of edge set values, one set value corresponds to, for example, a combination of three types of mark lengths, which are the shortest mark length, a mark length which is a channel bit (T) longer than the shortest mark length, and a mark length which is two channel bits (2T) longer than the shortest mark length, and a space length before and after the marks (here there are also three types). In the case of an 8–16 modulation signal which is used for DVD (Digital Versatile Disc), for example, the shortest mark and space length is 3T. So the edge set value of the start edge pulse is learned for each combination of recording mark lengths 3T, 4T and 5T or more and the proceeding space lengths 3T, 4T and 5T or more (3×3=9 types), and the edge set value of the end edge pulse is learned for each combination of the recording mark lengths 3T, 4T and 5T or more and subsequent space lengths 3T, 4T and 5T or more (3×3=9 types). The edge set values may be learned for 4×4=16 types of combinations for each start edge and end edge, using four types of mark and space lengths 3T, 4T, 5T and 6T or more. FIGS. 4(a) to (c) show an example of the reference pattern of the reproducing learning area.

FIGS. 4(a) to (c) are waveform diagrams of reference patterns, where an edge interval is measured when there is a 3T mark with a 5T space before or after the mark in (a), when there is a 3T mark with a 4T space before or after the mark in (b), and when there is a 3T mark with a 3T space before or after the mark in (c). The respective reference patterns have a DC component and are designed such that the average length of marks and spaces becomes equal without generating offset during binary processing.

When the edge set values are determined in this way, processing shifts to the information signal recording step. The system controller 23 notifies the recording signal processing circuit 18 and the laser drive circuit 21 of the information signal recording mode, and outputs the control signal to the head transfer table 10 so as to move the light beam ends, the information to be recorded, such as digital audio/video data and computer data which is output from the host computer 102, is transmitted to the edge position adjustment circuit 20 as multi-pulsed modulation data via the recording signal processing circuit 18 and the modulation circuit 10. The edge position adjustment circuit 20 corrects the edges of the start edge pulse and the end edge pulse of the modulation data to optimun positions based on the table of the edge set values determined in the recording learning step. According to the recording pulses corrected in this way, the laser drive circuit 21 has the semiconductor laser 3 emit and creates mark and spaces with appropriate lengths on the optical disk 1.

The information signals recorded on the optical disk 1 in this way are reproduced as follows. The light beam, which is emmited to the recorded information signals and modulated, is converted to binary signals via the photo-detector 8, amplifier 11, waveform equivalent circuit 12, group-delay correction circuit 13 and binary circuit 14, and the binary signals, and output the data and clock to the demodulation circuit 16 as digital reproducing signals. The demodulation circuit 16 demodulates the digital reproducing signals and outputs the digital reproducing signals to the reproducing signal processing circuit 17. The reproducing signal processing circuit 17 corrects errors of the demodulation signals and outputs the corrected demodulation signals to the host computer 102 as reproducing data.

In this way, in accordance with this embodiment, the edge shift amount caused by thermal interference between marks is corrected using a reference pattern before learning so that the group-delay characteristic of the reproducing system becomes flat, and as a result, the edge positions of the recording data after learning by the test pattern always converges to a predetermined length. Therefore, the reproducing compatibility among reproducing apparatuses improve.

In this embodiment, the reference pattern used for the reproducing learning step is formed on the optical disk 1 having the information signal area, but may be formed on a dedicated disk having only embossed pits for the reproducing learning step. The array of the mark length and space length of the reference pattern may be the same as the array of the test pattern.

Embodiment 2

Figure 5:
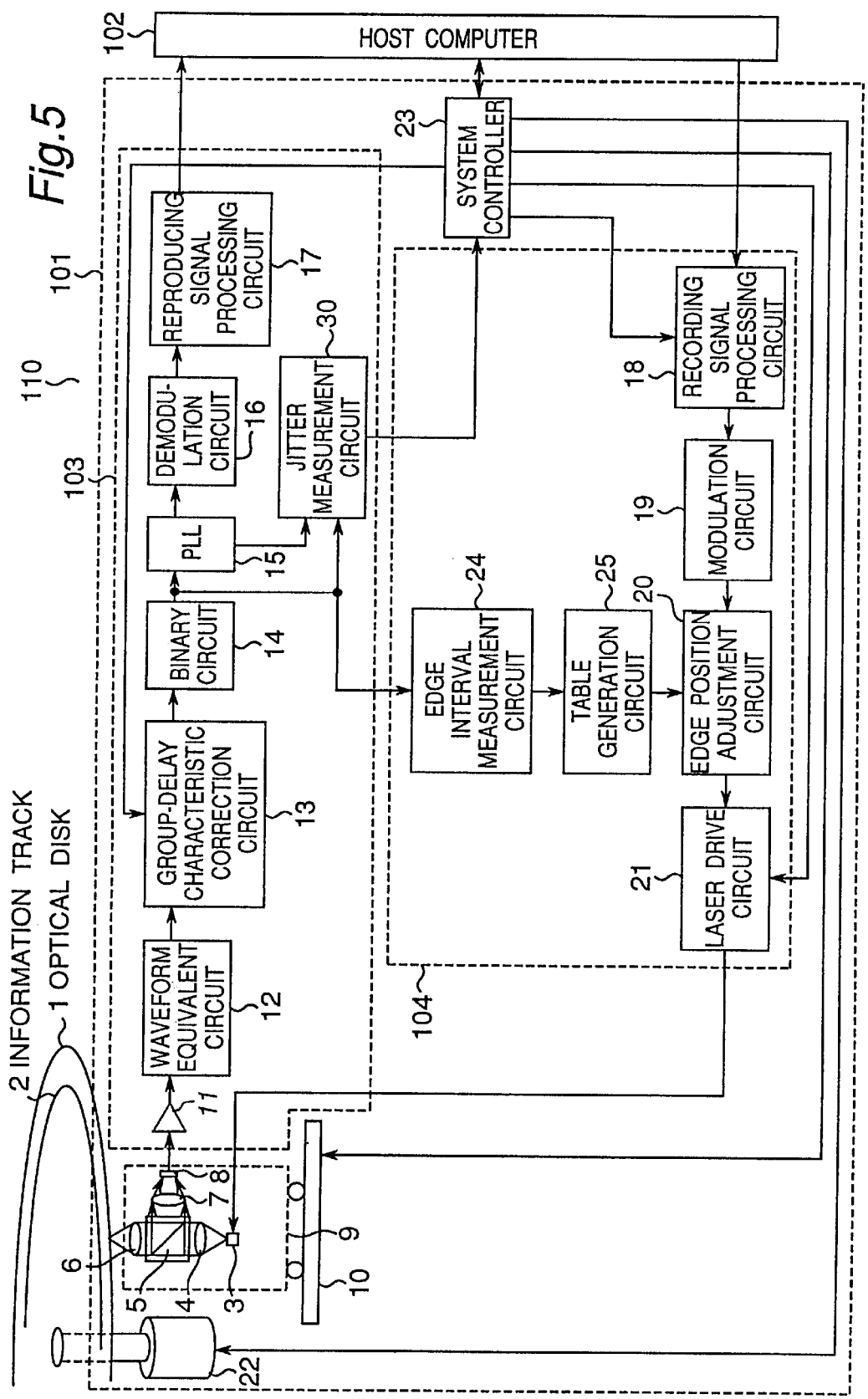
FIG. 5 is a block diagram depicting a configuration of an optical disk unit where an optical information recording/ reproducing method in accordance with a second embodiment of the present invention is applied.

FIG. 5 shows a configuration of an optical disk unit 110 where the optical information recording/reproducing method in accordance with the second embodiment of the present invention is applied.

In FIG. 5, since elements that are the same as those of the optical disk unit 100 of the first embodiment shown in FIG. 1 are denoted with the same numerals as FIG. 1, a detailed explanation for these elements is omitted. The difference from FIG. 1 is that the optical disk unit in FIG. 5 has a jitter measurement circuit 30 which receives binary reproducing signals output from the binary circuit 14 and a reproducing clock output from the PLL 15, measures the jitter of the reproducing signals, and outputs the result as jitter information.

Also in the reproducing learning area of the optical disk 1, random pattern data comprised of embossed pits based on the same modulation system as the recording data is disposed rather than the reference pattern where a specific length of embossed pits are periodically formed.

Using the optical disk unit 110 configured as above, the optical information recording/reproducing method in accordance with this embodiment will be described.

In the optical information recording/reproducing method in accordance with this embodiment, processing is also executed in the sequence of the reproducing learning step by reproducing the reproducing learning area, recording learning step in the recording learning area, and recording step of information signals. In this embodiment, the recording learning step and the recording step of the information signals are executed in the same way as the first embodiment, and only the reproducing learning step which is executed prior to these steps is different.

At first, the light beam is moved to the reproducing learning area on the optical disk 1, and the binary signal which the binary circuit 14 outputs when the random pattern data created by embossed pits is reproduced is transmitted to the PLL 15 and the jitter measurement circuit 30. The jitter measurement circuit 30 measures the jitter between the binary signal and the reproducing clock which the PLL 15 outputs, and transmits the measurement result to the system controller 23 as jitter information. The jitter information may be, for example, the data when the phase difference between the binary signal and a reproducing clock is integrated and converted to the voltage value, and then is AD (Analog-Digital) converted and encoded.

If the jitter value of the reproducing signal is higher than a predetermined threshold value, the system controller 23 judges that the group-delay characteristic of the reproducing system is not flat, and outputs a control signal for correction to the group-delay characteristic correction circuit 13. The group-delay characteristic correction circuit 13 has a characteristic where the delay of the output signal from.the input signal is a linear function of the frequency, for example, and the proportional coefficient is changed by the control signal for correction. By measuring jitter values sequentially while changing the proportional coefficient in various ways, the system controller 23 determines the optimum value of the proportional coefficient, and ends the reproducing learning step.

Hereafter, the edge shift amount of the mark and space is learned by recording and reproducing the test pattern in the recording learning step, and based on this result, the recording data is recorded with the correct length of the mark and space, just like the first embodiment.

In this way, according to this embodiment, the group-delay characteristic of the reproducing system is corrected such that the reproducing jitter of the random pattern data comprised of embossed pits reaches a minimum before learning the edge shift amount caused by the thermal interference between the marks in the recording learning step, so the edge position of the recording data after learning by the test pattern always converges to a predetermined length. Therefore, the reproducing compatibility among reproducing apparatuses improves. Also, the random pattern data comprised of embossed pits in the same modulation system as recording data is used, so the control data where disk management information is recorded with embossed pits in advance can also be used as a random pattern data, and as a result, disk utilization efficiency improves.

Here, the relationship between the delay amount and the frequency in the group-delay characteristic correction circuit 13 is a linear function, but the function is not limited to this.

Embodiment 3

Figure 6:
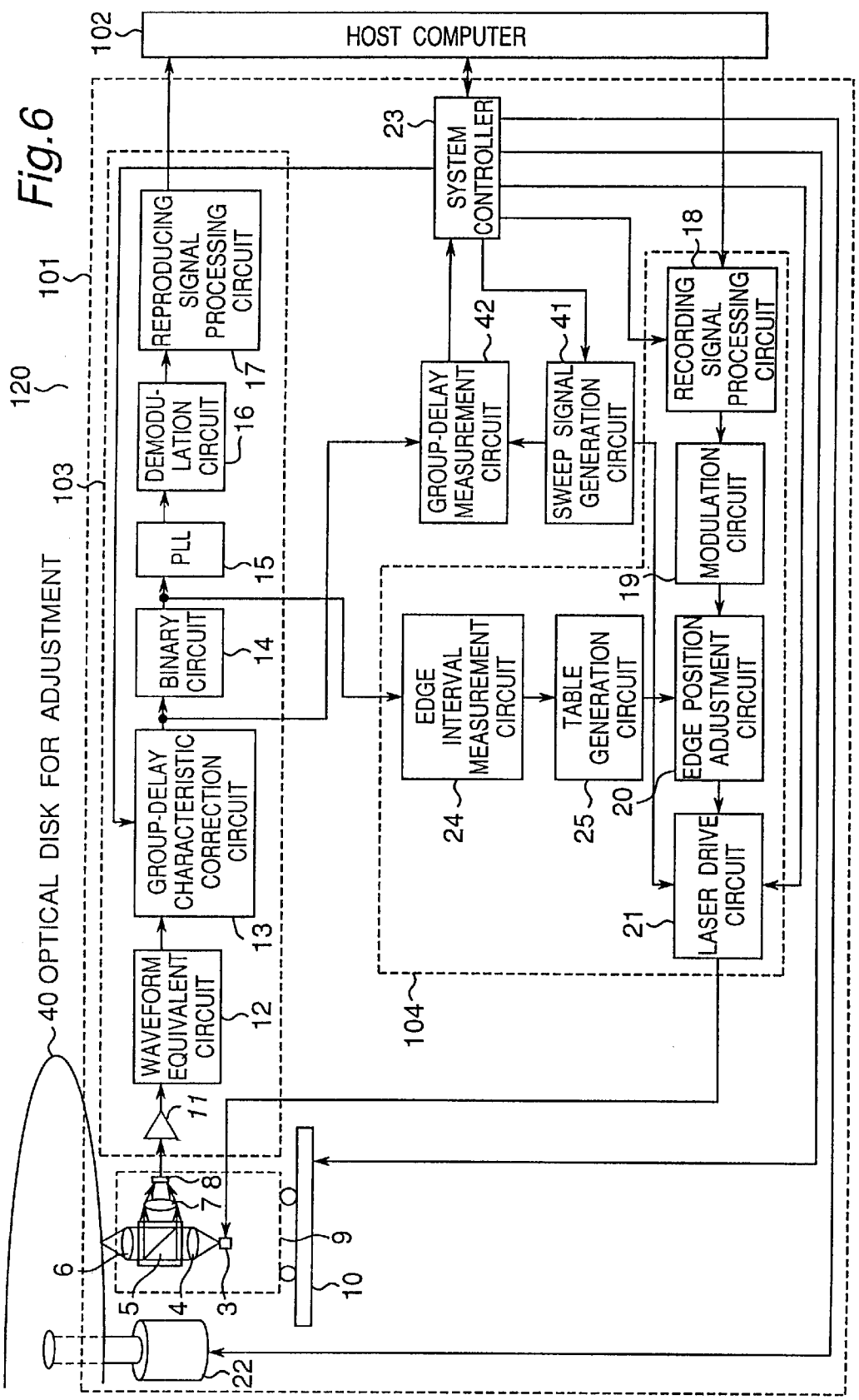
FIG. 6 is a block diagram depicting a configuration of an optical disk unit where an optical information recording/ reproducing method in accordance with a third embodiment of the present invention is applied.

FIG. 6 shows a configuration of an optical disk unit 120 where the optical information recording/reproducing method in accordance with the third embodiment of the present invention is applied.

In FIG. 6, since elements that are the same as those of the optical disk unit 100 of the first embodiment shown in FIG. 1 are denoted with the same numerals as FIG. 1, a detailed explanation for these elements is omitted. The difference from FIG. 1 is that the optical disk unit in FIG. 6 has an optical disk for adjustment 40, instead of the optical disk 1, and has a sweep signal generation circuit 41 which outputs a frequency sweep signal of a sine wave where the frequency changes continuously or discretely, and a group-delay measurement circuit 42 which receives the frequency sweep signal and reproducing signal output from the group-delay characteristic correction circuit 13, measures the delay characteristic between these signals, and outputs the result to the system controller 23 as group-delay measurement data. The frequency sweep signal is also transmitted to the laser drive circuit 21, where the frequency sweep signal is superimposed on the drive current for the laser.

The entire surface of the optical disk for adjustment 40 is a mirror surface, where guiding grooves and embossed pits do not exist.

Using the optical disk unit 120 configured as above, the optical information recording/reproducing method in accordance with this embodiment will be described.

In the optical information recording/reproducing method in accordance with this embodiment, processing is also executed in the sequence of the reproducing learning step by reproducing the reproducing learning area, the recording learning step in the recording learning area, and the recording step of information signals. In this embodiment as well, the recording learning step and the recording step of information signals are executed in the same way as the first and second embodiments, and only the reproducing learning step which is executed prior to these steps is different.

At first, the system controller 23 emits the semiconductor laser 3 at a predetermined intensity for reproducing, and controls the focus of the light beam on the mirror face of the rotating optical disk for adjustment 40. Then the system controller 23 controls the sweep signal generation circuit 41 to transmit the frequency sweep signal to the laser drive circuit 21 and the group-delay measurement circuit 42. The laser drive circuit 21 superimposes the frequency sweep signal on the drive current for reproducing power, and outputs it to the semiconductor laser 3. The intensity of the light beam emitted by the semiconductor laser 3 is modulated by the frequency sweep signal. The light beam modulated by the frequency sweep signal is reflected on the mirror face of the disk and is received by the photo-detector 8. The light detection signal from the photo-detector 8 is transmitted to the group-delay measurement circuit 42 as the measurement target signal via the amplifier 11, waveform equivalent circuit 12 and the group-delay characteristic correction circuit 13. The light beam reflected on the mirror face of the disk has been modulated by the frequency sweep signal, so the measurement target signal has also been modulated by the frequency sweep signal, and has been influenced by the group-delay characteristic of the reproducing system. The group-delay measurement circuit 42 measures the phase difference between the frequency sweep signal received from the sweep signal generation circuit 41 and the measurement target signal with respect to a plurality of frequencies, and transmits the measurement result to the system controller 23 as the group-delay characteristic data. Based on the received group-delay characteristic data, the system controller 23 outputs the control signal for correction to the group-delay characteristic correction circuit 13 so that the group-delay characteristic of the reproducing system becomes flat. In this way, the group-delay characteristic of the reproducing system becomes flat, and the reproducing learning step ends.

Next, in the recording learning step, the optical disk for adjustment 40 is exchanged with the optical disk 1 to record the information signals. Hereafter, this unit learns the edge shift amount by recording and reproducing the test pattern in the recording learning step, just like the first embodiment, and records the recording data with correct mark and space lengths based on the result.

In this way, according to this embodiment, the intensity of the light beam is modulated by the frequency sweep signal where the frequency changes continuously or discretely, the light beam reflected on the mirror face of the disk is received, the reproducing signal via the reproducing system and the frequency sweep signal are compared, and the group-delay characteristic of the reproducing system is corrected based on the result before learning the edge shift amount caused by the thermal interference between marks in the recording learning step. Therefore, the edge position of the recording data after learning by the test pattern always converges to a predetermined length. Therefore, the reproducing compatibility among reproducing apparatuses improves. Also, the group-delay characteristic is measured synchronizing with the frequency sweep signal where the frequency changes continuously or discretely, so measurement accuracy is high and the edge position accuracy of the recording data improves.

In the above description, the sweep signal generation circuit 41 and the group-delay characteristic measurement circuit 42 are a part of the optical disk unit 120, but if the reproducing learning step is executed during the manufacturing steps of the optical disk unit, these circuits 41 and 42 may be an external measuring instrument, such as a network analyzer, which can measure the group-delay characteristic. In this case, the group-delay data can be input to the system controller 23 from the host computer 102.

Embodiment 4

Figure 7:
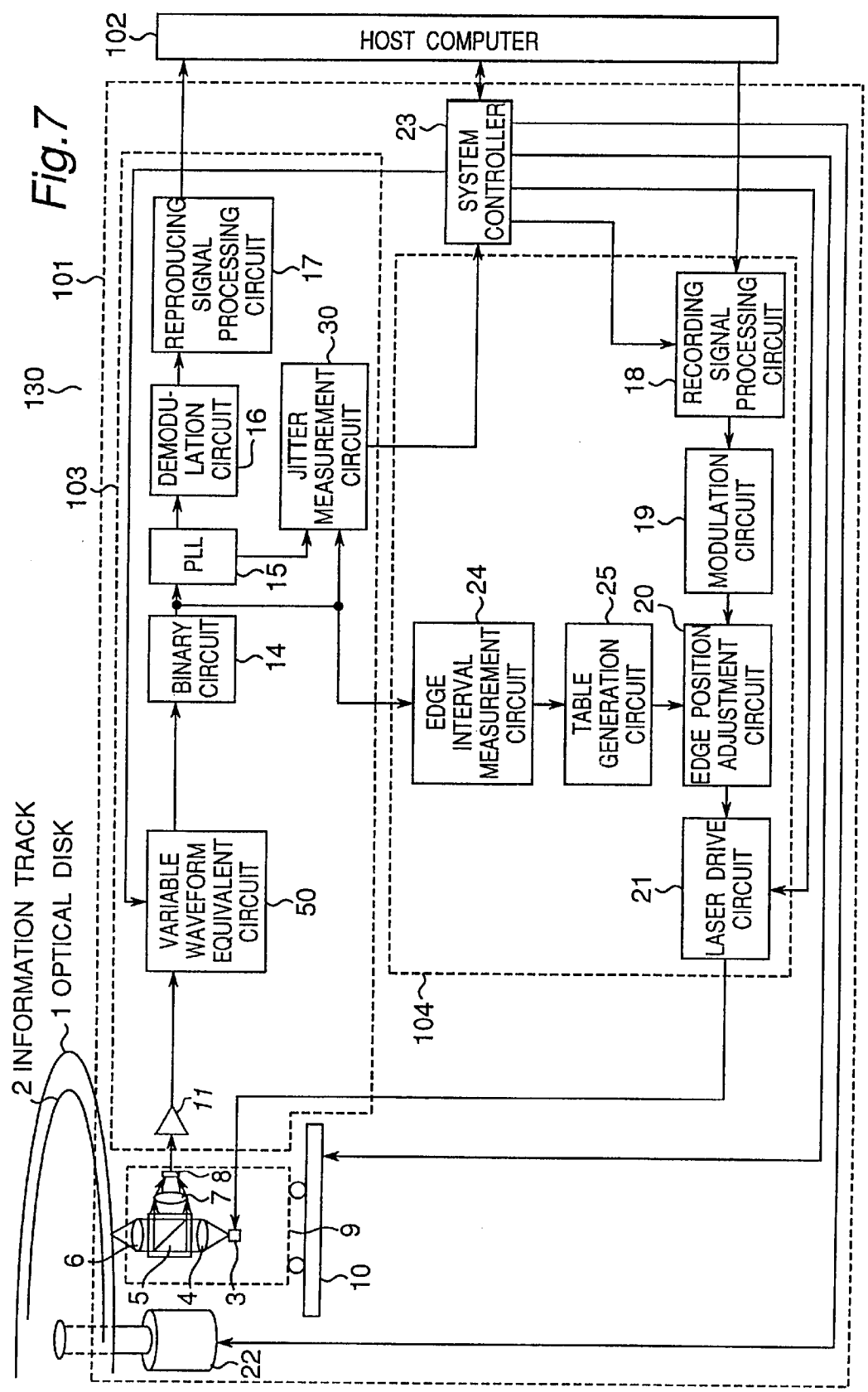
FIG. 7 is a block diagram depicting a configuration of an optical disk unit where an optical information recording/ reproducing method in accordance with a fourth embodiment of the present invention is applied.

FIG. 7 shows a configuration of an optical disk unit 130 where the optical information recording/reproducing method in accordance with the fourth embodiment of the present invention is applied.

Figure 8:
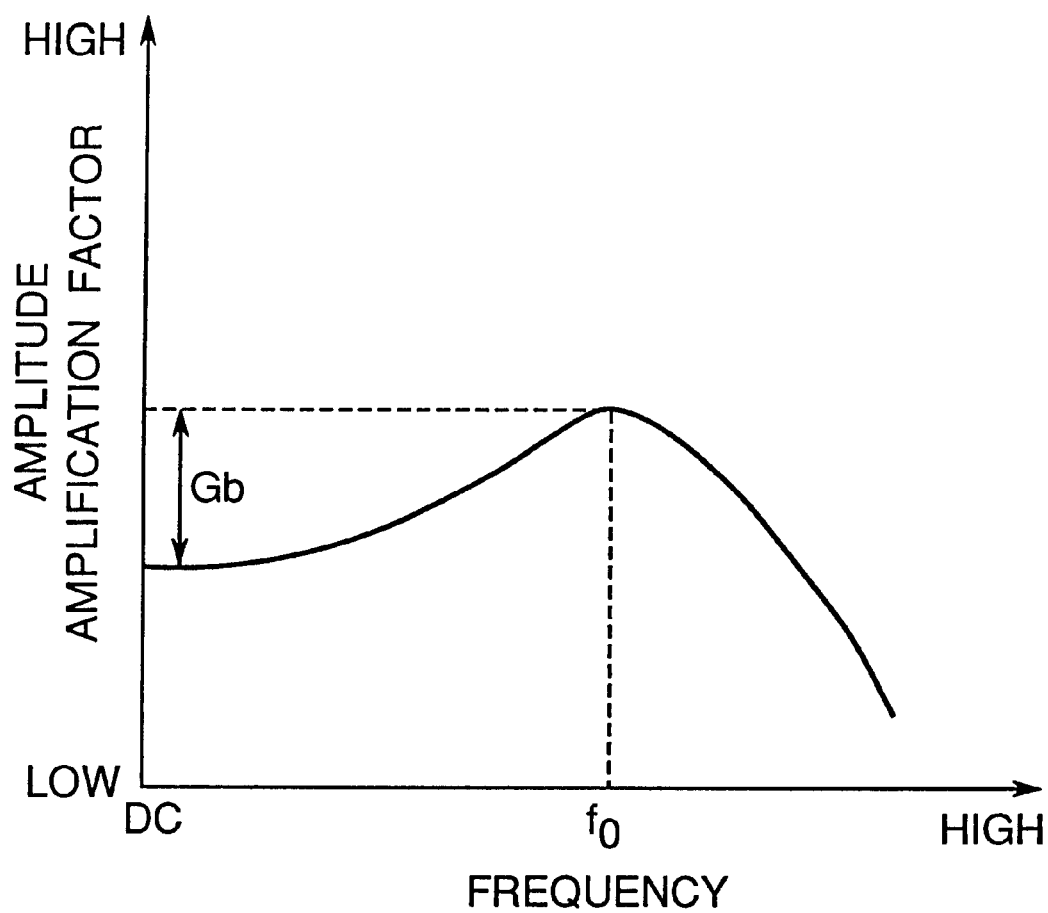
FIG. 8 is a frequency characteristic diagram of a waveform equivalent circuit used for the optical disk unit.

In FIG. 7, since elements that are the same as those of the optical disk unit 110 of the second embodiment shown in FIG. 5 are denoted with the same numerals as FIG. 5, a detailed explanation of these elements is omitted. The difference from FIG. 5 is that the group-delay characteristic correction circuit 13 is not present and a variable waveform equivalent circuit 50 is disposed instead of the waveform equivalent circuit 12. The variable waveform equivalent circuit 50 receives the reproducing signal from the amplifier 11 and converts the reproducing signal such that the amplitude amplification factor for the high frequency area is high, where the amplification factor can be switched by the control signal for correction from the system controller 23. FIG. 8 shows a graph of the frequency characteristic of the variable waveform equivalent circuit 50. As FIG. 8 shows, the amplitude amplification factor in the frequency denoted by fo is Gb higher compared with the DC amplification factor. This Gb is called the "boost amount", and it moves up or down according to the control signal for correction in this embodiment.

The fourth embodiment is also the same as the second embodiment where the random pattern data comprised of embossed pits based on the same modulation system as the recording data is disposed in the reproducing learning area of the optical disk 1.

Using the optical disk unit 130 configured as above, the optical information recording/reproducing method in accordance with this embodiment will be described.

In the optical information recording/reproducing method in accordance with this embodiment, processing is also executed in the sequence of the reproducing learning step by reproducing the reproducing learning area, the recording learning step in the recording learning area, and the recording step of information signals. In this embodiment, the recording learning step and the recording step of information signals are executed in the same way as the first to third embodiments, and only the reproducing learning step which is executed prior to these steps is different.

At first, the light beam is moved to the reproducing learning area on the optical disk 1, and the binary signal which the binary circuit 14 outputs when the random pattern data created by embossed pits is reproduced is transmitted to the PLL 15 and the jitter measurement circuit 30. The jitter measurement circuit 30 measures the jitter between the binary signal and the reproducing clock which the PLL 15 outputs, and transmits the measurement result to the system controller 23.

If the jitter value is higher than a predetermined threshold value, the system controller 23 judges that the amplitude frequency characteristic of the reproducing system is inappropriate, and outputs the control signal for correction to the variable waveform equivalent circuit 50. By sequentially measuring the jitter while changing the boost amount of the variable waveform equivalent circuit 50 in various ways, the system controller 23 determines the optimum value of the boost amount, and ends the reproducing learning step.

Hereafter, the edge shift amount is learned by recording and reproducing the test pattern in the recording learning step, and based on this result, the recording data is recorded with the correct length, just like the second embodiment.

In this way, according to this embodiment, the waveform equivalent characteristic of the reproducing system is corrected such that the reproducing jitter of the random pattern data comprised of embossed pits becomes smallest before learning the edge shift amount caused by the thermal interference between marks in the recording learning step, so that the edge position of the recording data after learning by the test pattern always becomes a length which corresponds to the embossed pits in the reproducing learning area. Therefore, the reproducing compatibility among reproducing apparatuses improves. Also the boost amount in the high frequency area in the waveform equivalent characteristic is variable, so the dispersion of resolution of the optical system can be corrected at the same time, and the reproducing compatibility further improves.

In the above description on the embodiments, only the learning of the edge position of the recording pulse was described in the recording learning step, but, it is also possible to introduce another learning step as a pre-step or post-step, such as a step for determining the optimum values of the peak power and bias power during recording.

It is important to determine the light spot shape on the recording film, which has major influence on the recording/reproducing characteristic, by the bias learning of focus. Therefore, it is effective to adjust the group-delay characteristic after executing the focus bias adjustment such that the amplitude of the reproducing signal becomes largest at the reference pattern where embossed pits with a specified length are periodically formed or at the random pattern data embossed pits comprised of embossed pits modulated in the same modulation system as the recording data. The reliability of the recording/reproducing apparatus can be further improved by combining the focus learning step, the reproducing learning step, the power learning step, and the recording learning step.

If the above learning does not converge into a desired range due to the life of the apparatus or other reasons, the user can be notified of the result via a display by diagnostic results such as "only reproducing possible", "recording impossible", or "recording/reproducing impossible", so as to make troubleshooting easier for the user.

As described above, the optical information recording/reproducing method of the present invention comprises a reproducing learning step where the frequency characteristic of the reproducing system which detects the changes of the local optical constant is switched to a predetermined frequency characteristic, and a recording learning step where the test pattern is recorded on the optical information recording medium, then is reproduced and the edge position of the start edge or end edge of the recording pulse is corrected for each combination of lengths of the mark block and proceeding or subsequent space, so that the edge position of binarized reproducing data comes to the desired position. Therefore, the frequency characteristic of the reproducing system can be unified before learning the edge shift amount caused by the thermal interference between marks, which means that the length of the recorded marks and spaces can always be a predetermined length, and the reproducing compatibility among reproducing apparatuses improves.

What is claimed is:

1. An optical information recording/reproducing method where length information on a mark block and a space block is used as data, the data is recorded in the form of changes of a local optical constant on a recording layer by emitting a light beam to an optical recording medium while switching an intensity of the light beam according to one or more recording pulses for the mark block, and the data is reproduced by detecting the changes of the local optical constant by a light beam with a predetermined intensity, said optical information recording/reproducing method comprising:

switching a frequency characteristic of a reproducing system for detecting a change of the local optical constant to a predetermined frequency characteristic; and reproducing a test pattern recorded on the optical recording medium, and correcting at least one of a start edge position and an end edge position of the one or more recording pulses for each combination of length of the mark block and length of the space block, which is either preceding or subsequent to the mark block, so that an edge position of binarized reproducing data converges to a desired position, wherein said switching operation is performed prior to said reproducing and correcting operations.

2. The optical information recording/reproducing method according to claim 1, wherein said switching operation comprises:

emitting the light beam with the predetermined intensity to a reference pattern, which has been formed on a substrate in advance as embossed pits having similar sizes as marks and spaces;

receiving the light beam which is reflected and outputting a reproducing signal;

binarizing the reproducing signal which is modulated according to the reference pattern;

measuring the edge position of the binarized reproducing signal; and smoothing a group-delay characteristic of the reproducing system based on the edge position measurement result.

3. The optical information recording/reproducing method according to claim 2, wherein the reference pattern is formed in a medium which is different from the optical recording medium where the test pattern and the data are recorded.

4. The optical information recording/reproducing method according to claim 1, wherein said switching operation comprises:

emitting the light beam with the predetermined intensity to a random pattern, which has been formed on a substrate in advance as embossed pits having similar sizes as marks and spaces, on the optical recording medium;

receiving the light beam which is reflected and outputting a reproducing signal;

binarizing the reproducing signal which is modulated according to the random pattern;

measuring jitter of the binarized reproducing signal; and smoothing a group-delay characteristic of the reproducing system based on the jitter measurement result.

5. The optical information recording/reproducing method according to claim 1, wherein said switching operation comprises:

emitting the light beam with the predetermined intensity to a random pattern, which has been formed on a substrate in advance as embossed pits having similar sizes as marks and spaces, on the optical recording medium;

receiving the light beam which is reflected and outputting a reproducing signal;

binarizing the reproducing signal which is modulated according to the random pattern;

measuring jitter of the binarized reproducing signal; and adjusting an amplitude frequency characteristic of the reproducing system based on the jitter measurement result.

6. The optical information recording/reproducing method according to claim 1, wherein said switching operation comprises:

modulating the predetermined intensity of the light beam with sweep signals where frequency changes continuously;

receiving the light beam which is reflected by a mirror surface of the optical information recording medium and outputting a reproducing signal;

comparing frequency characteristics of phases of the sweep signal and the reproducing signal; and smoothing a group-delay characteristic of the reproducing system based on the comparison result.

7. The optical information recording/reproducing method according to claim 1, wherein said reproducing and correcting operations comprise:

recording the test pattern in a recording learning area on the optical recording medium;

emitting the light beam with the predetermined intensity to the test pattern;

binarizing a reproducing signal output from a photodetector according to the test pattern;

detecting edge positions of marks and spaces of the test pattern from the binarized reproducing signal;

storing a deviation amount of the detected edge position from a target position, as an edge correction amount, for each combination of the length of the mark block and the length of the space block, which is either preceding or subsequent to the mark block; and correcting the at least one of the start edge position and the end edge position of the one or more recording pulses according to the edge correction amount.

8. An optical information recording/reproducing apparatus where length information on a mark block and a space block is used as data, the data is recorded in the form of changes of a local optical constant on a recording layer by emitting a light beam to an optical recording medium while switching an intensity of the light beam according to one or more recording pulses for the mark block, and the data is reproduced by detecting the changes of the local optical constant by a light beam with a predetermined intensity, said optical information recording/reproducing apparatus comprising:

a reproducing learning arrangement being operable to switch a frequency characteristic of a reproducing system for detecting a change of the local optical constant to a predetermined frequency characteristic; and a recording learning arrangement being operable to reproduce a test pattern recorded on the optical recording medium and correct at least one of a start edge position and an end edge position of the one or more recording pulses for each combination of length of the mark block and length of the space block, which is either preceding or subsequent the mark block, so that an edge position of binarized reproducing data converges to a desired position, wherein said reproducing learning arrangement switches the frequency characteristic prior to said recording learning arrangement reproducing the test pattern and correcting the at least one of the start edge position and the end edge position.

9. The optical information recording/reproducing apparatus according to claim 8, wherein said reproducing learning arrangement comprises:

an emitting arrangement operable to emit the light beam with the predetermined intensity to a reference pattern, which has been formed on a substrate in advance as embossed pits having similar sizes as marks and spaces;

a receiving arrangement being operable to receive the light beam which is reflected and output a reproducing signal;

a binarizing arrangement being operable to binarize the reproducing signal which is modulated according to the reference pattern;

a measuring arrangement being operable to measure the edge position of the binarized reproducing signal; and a smoothing arrangement being operable to smooth a group-delay characteristic of the reproducing system based on the edge position measurement result.

10. The optical information recording/reproducing apparatus according to claim 9, wherein the reference pattern is formed in a medium which is different from the optical recording medium where the test pattern and the data are recorded.

11. The optical information recording/reproducing apparatus according to claim 8, wherein said reproducing learning arrangement comprises:

an emitting arrangement being operable to emit the light beam with the predetermined intensity to a random pattern, which has been formed on a substrate in advance as embossed pits having similar sizes as marks and spaces, on the optical recording medium;

a receiving arrangement being operable to receive the light beam which is reflected and output a reproducing signal;

a binarizing arrangement being operable to binarize the reproducing signal which is modulated according to the random pattern;

a measuring arrangement being operable to measure jitter of the binarized reproducing signal; and a smoothing arrangement being operable to smooth a group-delay characteristic of the reproducing system based on the jitter measurement result.

12. The optical information recording/reproducing apparatus according to claim 8, wherein said reproducing learning arrangement comprises:

an emitting arrangement being operable to emit the light beam with the predetermined intensity to a random pattern, which has been formed on a substrate in advance as embossed pits having similar sizes as marks and spaces, on the optical recording medium;

a receiving arrangement being operable to receive the light beam which is reflected and output a reproducing signal;

a binarizing arrangement being operable to binarize the reproducing signal which is modulated according to the random pattern;

a measuring arrangement being operable to measure jitter of the binarized reproducing signal; and an adjusting arrangement being operable to adjust an amplitude frequency characteristic of the reproducing system based on the jitter measurement result.

13. The optical information recording/reproducing apparatus according to claim 8, wherein said reproducing learning arrangement comprises:

a modulating arrangement being operable to modulate the predetermined intensity of the light beam with sweep signals where frequency changes continuously;

a receiving arrangement being operable to receive the light beam which is reflected by a mirror surface of the optical information recording medium and output a reproducing signal;

a comparing arrangement being operable to compare frequency characteristics of phases of the sweep signal and the reproducing signal; and a smoothing arrangement being operable to smooth a group-delay characteristic of the reproducing system based on the comparison result.

14. The optical information recording/reproducing apparatus according to claim 8, wherein said recording learning arrangement comprises:

a recording arrangement being operable to record the test pattern in a recording learning area on the optical recording medium;

an emitting arrangement being operable to emit the light beam with the predetermined intensity to the test pattern;

a binarizing arrangement being operable to binarize a reproducing signal output from a photo-detector according to the test pattern;

a detecting arrangement being operable to detect edge positions of marks and spaces of the test pattern from the binarized reproducing signal;

a storing arrangement being operable to store a deviation amount of the detected edge position from a target position, as an edge correction amount, for each combination of the length of the mark block and the length of the space block, which is either preceding or subsequent to the mark block; and a correcting arrangement being operable to correct the at least one of the start edge position and the end edge position of the one or more recording pulses according to the edge correction amount.

\* \* \* \* \*